United States Patent Office 3,390,157
Patented June 25, 1968

3,390,157
**3-DESOXY-6α-METHYL-17α-OXYGENATED-
Δ⁴-PREGNENES**
Irving Scheer, Somerville, N.J., assignor to Ortho
Pharmaceutical Corporation, a corporation of
New Jersey
No Drawing. Filed July 24, 1961, Ser. No. 125,995
7 Claims. (Cl. 260—397.4)

The present invention relates to a new group of esters of 6α-methyl-4-pregnen-17α-ol-20-one having the structure

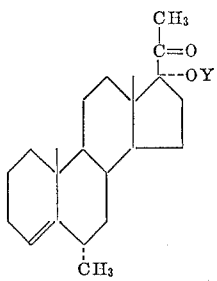

in which Y is a radical selected from the group consisting of hydrogen and alkanoyl radicals.

The compounds of this invention are valuable pharmaceutical agents. The esters of 6α-methyl-4-pregnen-17α-ol-20-one possess anti-ovulatory properties and are effective in regulating ovulation. The acetate for example has practically no estrogenic properties and does not stimulate the endometrium yet prevents ovulation at lower levels than 17α-ethynylestra-4-en-17β-ol-3-one or 17α-ethynyl-5(10)-estren-17β-ol-3-one. Moreover the compounds of the present invention administered orally prevent ovulation at dosage levels well below those at which androgenic effects become prominent. The esters of the present invention can be administered in conventional dosage forms such as pills, tablets, capsules, syrups or elixirs for oral use. The products of the present invention may also be compounded in a form suitable for injection.

It is an object of the present invention to make available an oral contraceptive that will have minimal side effects.

The starting material for the compounds of the present invention is 6α-methyl-17α-hydroxyprogesterone which is reduced to 6α-methyl-4-pregnen-17α-ol-20-one by the following sequence of reactions:

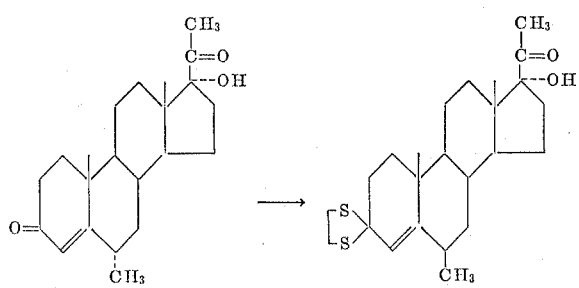

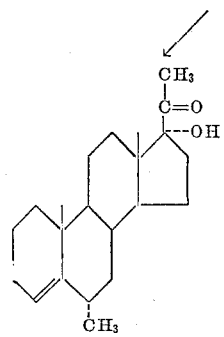

The free alcohol so obtained has little antiovulatory effect but may be esterified by the procedures described in the following examples to produce the esters of the present invention.

Example I.—6α-methyl-4-pregnen-17α-ol-20-one

A mixture of one gram 6α-methyl-4-pregnen-17α-ol-3,20-dione, 1 ml. of ethane dithiol, 2 ml. of methylene chloride and 1 gram of pyridine hydrochloride is stirred gently at room temperature for three minutes. The reaction is quenched by adding 30 ml. of methanol and cooling the flask in an ice bath for 2 minutes. The resulting precipitate is filtered, washed with ice-cold methanol and dried under vacuum at room temperature. The 6α-methyl-4-pregnen-17α-ol-20-one-3-thioketal so obtained may be recrystallized from methanol-methylene dichloride to give 0.9 gram of a product melting at 186–188° C. The optical rotation in chloroform $\alpha_D^{20}$ is +99°.

Two grams of the 6α-methyl-4-pregnen-17α-ol-20-one-3-thioketal obtained as described above is placed in a flask with 200 ml. of 95% ethanol, and 50 grams of Raney nickel stored under 95% ethanol is added to the flask. The contents of the flask are refluxed overnight with stirring. The reaction mixture is then cooled to room temperature and filtered. The filtrate is evaporated to dryness under vacuum and the solid residue is crystallized from methanol-methylene dichloride to yield 0.95 gram of 6α-methyl-4-pregnen-17α-ol-20-one melting at 190–193° C. The optical rotation in chloroform $\alpha_D^{20}$ is +51°.

Analysis. — Calculated for $C_{22}H_{34}O_2$: C=79.94, H=10.37. Found: C=79.95, H=10.31.

Example II.—6α-methyl-4-pregnen-17α-ol-20-one acetate

One and one-half grams of 6α-methyl-4-pregnen-17α-ol-20-one, 75 ml. of glacial acetic acid, 15 ml. of acetic anhydride and 1.5 grams of para-toluene sulfonic acid are mixed in a flask and allowed to stand overnight at room temperature. The reaction mixture is poured into ice water and the crystals that form are recrystallized from methanol-methylene dichloride. One and three-tenths grams of 6α-methyl-4-pregnen-17α-ol-20-one acetate is recovered melting at 173–175° C. The optical rotation in chloroform $\alpha_D^{20}$ is +42°.

Analysis. — Calculated for $C_{24}H_{36}O_3$: C=77.37, H=9.74. Found: C=77.18, H=9.86.

Example III.—6α-methyl-4-pregnen-17α-ol-20-one propionate

To a mixture of 4.0 grams 6α-methyl-4-pregnen-17α-ol-20-one, 200 ml. propionic acid and 40 ml. propionic anhydride is added 4 grams para-toluene sulfonic acid. A clear solution results within 30 minutes. The solution is permitted to stand overnight at room temperature and is then poured into ice water. The resulting mixture is extracted with ether and the oil recovered from the ether extract is crystallized from methanol. Recrystallization from methanol-methylene chloride yields 3.8 grams of 6α-methyl-4-pregnen-17α-ol-20-one propionate melting at 143–144°. The optical rotation in chloroform $\alpha_D^{20}$ is +35°.

*Analysis.* — Calculated for $C_{25}H_{38}O_3$: C=77.67, H=9.91. Found: C=77.79, H=9.97.

Example IV.—6α-methyl-4-pregnen-17α-ol-20-one hexanoate

Two grams of 6α-methyl-4-pregnen-17α-ol-20-one and 42.4 ml. of hexanoic anhydride are placed in a 3-necked flask equipped with a drying tube and nitrogen inlet tube. Two grams paratoluene sulfonic acid is added. After standing one hour at room temperature, a clear solution results. The solution is permitted to stand 5 days at room temperature under nitrogen. Ten milliliters of pyridine is then added and the mixture is steam distilled. The residue remaining in the distillation flask is extracted with ether and the ether extract is washed until neutral. The ether extract is dried over sodium sulfate and is then evaporated to dryness. The residual brown oil may be chromatographed on neutral alumina and crystallized from methanol-methylene dichloride to yield 1.5 grams of crystallized 6α-methyl-4-pregnen-17α-ol-20-one hexanoate melting at 78–79°. The optical rotation in chloroform $\alpha_D^{20}$ is +20°.

*Analysis.*—Calculated for $C_{28}H_{44}O_3$: C=78.45, H=10.35. Found: C=78.09, H=9.81.

Example V.—6α-methyl-4-pregnen-17α-ol-20-one cyclopentylpropionate

To a mixture of 1.0 g. 6α-methyl-4-pregnen-17α-ol-20-one and 10 ml. cyclopentylpropionic acid is added, dropwise, 4 ml. trifluoroaceticanhydride. The resulting solution is heated under nitrogen on the steam bath for 15 minutes. The purple solution so obtained is rapidly poured into 500 ml. of a 2% sodium bicarbonate solution. The mixture is stirred for 30 minutes extracted with methylene dichloride. The methylene dichloride extract is washed until neutral with 5% aqueous sodium hydroxide then washed with water and dried over anhydrous sodium sulfate. The methylene dichloride solution so obtained is concentrated and chromatographed on neutral alumina. The chromatographed solution gave 830 ml. of crystalline 6α-methyl-4-pregnen-17α-ol-20-one cyclopentylpropionate melting at 93–95°.

*Analysis.*—Calculated for $C_{30}H_{46}O_3$: C=79.24, H=10.20. Found: C=79.01, H=10.27.

An anti-littering assay may be designed to compare the anti-littering effect of 3-desoxy-6α-methyl-17α-acetoxy progesterone, prepared as described in Example II above, and 3-desoxy-17α-acetoxy-progesterone, by administering these compounds to adult rats and mice. The sequence of the experiment is as follows:

(1) The drug to be evaluated is administered in the die for 7 days with the sexes segregated.

(2) The drug treatment is continued with the sexes co-habitant over a period of 15 days.

(3) The sexes are segregated and observed for 21 days with no drug treatment.

A control group is similarly treated except that no drug is administered. The control and experimental groups may be compared by the Chi-square test to determine significance of reduced littering. The results are tabulated in Tables I and III.

TABLE I.—COMPARISON OF ANTI-LITTERING EFFECTS IN RATS

|  | 3-desoxy-6α-methyl-17α-acetoxyprogesterone | | 3-desoxy-17α-acetoxyprogesterone, 40 mg./kg. | Representative Control |
|---|---|---|---|---|
|  | 0.5 mg./kg. | 1.0 mg./kg. | | |
| Percent Littering | 20 | Zero | 60 | 60 |
| Body wt. change,[1] grams | +28.7 | +26.0 | +34.0 | +25.5 |
| Significance, p | [2] NS | <0.01 | NS | |

[1] During first two weeks of treatment. [2] Not significant.

TABLE II.—COMPARISON OF ANTI-LITTERING EFFECTS IN MICE

|  | 3-desoxy-6α-methyl-17α-acetoxyprogesterone | | | 3-desoxy-17α-acetoxyprogesterone, 40 mg./kg. | Representative Control |
|---|---|---|---|---|---|
|  | 10 mg./kg. | 40 mg./kg. | 60 mg./kg. | | |
| Percent Littering | 26.6 | 13.3 | Zero | 60 | 66.7 |
| Body wt. change,[1] grams | +0.8 | +3.3 | +5.0 | +3.0 | +2.1 |
| Significance, p | <0.1 | <0.01 | <0.001 | [2] NS | |

[1] During first two weeks of treatment. [2] Not significant.

It will be observed from Table I above that the acetate described in Example II reduces littering at doses of 0.5 and 1.0 mg. per kilogram of body weight in the rat. The related compound lacking a methyl group in the 6-position did not impair the fertility of the rat.

From Table II, it will be observed that dosage levels of about 60 mg. per kg. in the mouse are required to prevent littering but the number of mice producing litters may be reduced by treatment of doses as low as 10 mg. per kg. At 40 mg. per kg. the related compound lacking a methyl group in the 6-position has no apparent effect on the littering of mice. The compound of the present invention is tolerated and allows normal body weight gain.

The estrogenic properties of the compounds of the present invention as mentioned above are minimal. The estrogenic potency of 6α-methyl-4-pregnen-17α-ol-20-one acetate may be determined by the standard assay procedure described by J. S. Evans, R. S. Varney and F. D. Koch in Endocrinology, 28, p. 247 (1941) using the uterine weight increase and precocious vaginal opening of immature mice as indications. From the data in Table III below one may compare the estrogenicity of the 3-desoxy-6α-methyl-17α-hydroxy progesterone acetate with 3-desoxy-17α-acetoxy progesterone and 6α-methyl-17α-hydroxy progesterone acetate.

TABLE III.—ORAL ESTROGEN ASSAY

| Total Dosage | Number of Animals | Ut. Wt. | Percent Ov. Wt. | Vaginal Opening | "P"—Chi² |
|---|---|---|---|---|---|
| 3-desoxy-17α-acetoxyprogesterone | | | | | |
| Control | 5 | 8.2±1.3 | 2.9±0.4 | 0 | |
| 0.1 mg | 10 | 6.7±0.47 | 3.2±0.32 | 0 | |
| 1.0 mg | 10 | 6.5±0.52 | 2.7±0.2 | 0 | |
| 5.0 mg | 10 | 6.3±0.4 | 2.7±0.17 | 0 | |
| 10.0 mg | 10 | 7.3±0.6 | 3.2±0.17 | 0 | |
| 3-desoxy-6α-methyl-17α-hydroxy progesterone acetate | | | | | |
| Control | 4 | 6.4±0.55 | 3.5±0.28 | 0 | |
| 1 mg | 9 | 7.5±0.4 | 3.3±0.28 | 0 | N.S. |
| 10 mg | 10 | 8.6±0.41 | 3.1±0.17 | 0 | <0.01 |
| 6α-methyl-17α-hydroxyprogesterone acetate | | | | | |
| Control | 5 | 4.6±0.54 | 2.0±0.42 | 0 | |
| 0.1 mg | 10 | 5.6±0.39 | 2.5±0.17 | 0 | N.S. |
| 1.0 mg | 10 | 6.6±0.35 | 2.8±0.22 | 0 | <0.01 |
| 5.0 mg | 9 | 6.8±0.49 | 2.5±0.31 | 0 | 0.01 |
| 10.0 mg | 8 | 8.6±0.5 | 2.7±0.22 | 0 | <0.01 |

3-desoxy-6α-methyl-17α-progesterone acetate induces a slight, statistically not significant increase with 1.0 mg.

total dose, but 10 mg. total dose causes an increase of uterine weights, yet it does not affect the vaginal area.

3-desoxy-17α-acetoxyprogesterone fails to stimulate an increase in uterine weights at any of the dose levels tested, (0.1 mg. to 10.0 mg. total dose), and there was no effect on precocious vaginal opening. Ovarian weights remained unchanged.

6α-methyl-17α-hydroxyprogesterone acetate is five to ten times more uterotrophic than 3-desoxy-6α-methyl-17α-progesterone acetate since 1.0 mg. total dose causes a significant uterine weight increase, yet the response curve rises very slowly with increasing doses. Vaginal opening is not affected.

In general it appears that none of the compounds in Table III are genuinely estrogenic in view of their low effects on uterine weight and failure to induce precocious vaginal opening. This response is more typical for that produced by weak progestational and androgenic agents. More potent androgens such as methyl testosterone with 1.0 mg. doses produces a uterine weight of 14 mg. and induces uniform vaginal opening in immature mice.

The androgenicity of the compounds of the present invention may be determined by a modification of the technique described by L. G. Henchberger, E. G. Shipley, and R. K. Meyer, Proc. Soc. Exp. Biol. and Med., 83, 170–175 (1953). Immature male rats are castrated and the compounds are administered by stomach tube starting the following day in 7 daily doses. Autopsies are performed on the day after the last treatment. The results are shown in Table IV.

TABLE IV.—ORAL ANDROGEN ASSAY

| Total Dose | Number of Animals | Seminal Vesicles | Ventral Prostate | Adrenals | Levator Ani |
|---|---|---|---|---|---|
| *3-desoxy-17α-hydroxyprogesterone acetate* | | | | | |
| Control | 9 | *4.6 (6.0) | *6.7 (8.8) | *15.3 (20.0) | *13.8 (17.8) |
| 0.1 mg | 10 | 4.3 (6.6) | 6.7 (10.2) | 15.3 (24.0) | 12.3 (18.0) |
| 1.0 | 10 | 4.1 (6.1) | 8.6 (12.0) | 12.5 (18.8) | 12.9 (19.3) |
| 10.0 mg | 9 | 3.7 (5.9) | 6.2 (10.0) | 11.8 (19.1) | 11.3 (18.2) |
| 20.0 mg | 10 | 3.7 (5.6) | 6.2 (9.5) | 12.2 (18.8) | 11.9 (18.3) |
| *3-desoxy-6α-methyl-17α-hydroxy-progesterone-acetate* | | | | | |
| Control | 10 | 4.0 (6.5) | 7.2 (11.7) | 11.4 (18.5) | 10.6 (17.0) |
| 0.1 mg | 10 | 3.8 (6.7) | 7.0 (12.2) | 12.4 (21.8) | 8.5 (14.2) |
| 1.0 mg | 10 | 4.3 (6.9) | 6.9 (10.9) | 12.0 (19.3) | 10.9 (17.4) |
| 10.0 mg | 9 | 5.3 (9.8) | 9.3 (17.4) | 8.3 (15.4) | 12.9 (22.4) |
| 20.0 mg | 10 | 6.6 (10.9) | 13.0 (21.6) | 6.0 (9.8) | 13.5 (22.0) |
| *6α-methyl-17α-hydroxy-progesterone acetate* | | | | | |
| Control | 10 | 3.6 (7.6) | 6.2 (13.2) | 10.7 (22.5) | 6.9 (14.2) |
| 0.1 mg | 10 | 3.9 (8.1) | 6.1 (12.8) | 10.7 (22.0) | 7.1 (14.5) |
| 1.0 mg | 9 | 4.6 (9.1) | 7.2 (14.5) | 10.8 (21.7) | 7.2 (14.4) |
| 10.0 mg | 9 | 5.1 (9.0) | 12.0 (21.3) | 7.7 (13.6) | 10.6 (18.6) |
| 20.0 mg | 9 | 4.7 (8.8) | 11.1 (20.9) | 6.7 (12.6) | 10.6 (19.6) |

*Values in parentheses expressed as mg. per 100 g. of body weight.

6α-methyl-4-pregnen-17α-ol-20-one on the basis of relative organ weights at dose levels up to 1.0 mg. total dose shows no androgenic and anabolic potency and does not affect the adrenals. At 10.0 and 20.0 mg. total dose it exerts an androgenic effect principally on the ventral prostate, but to a lesser degree on the semi vesicles. The anabolic effect is only slight.

In comparison 10.0 mg. total dose of methyl testosterone produces a relative weight for ventral prostate of 80 and of the seminal vesicles of 42 (versus 17 and 10 respectively for 6α-methyl-4-pregnen-17α-ol-20-one acetate).

The estrogenic and androgenic effects of desoxy 6α-methyl-17α-hydroxy progesterone may be compared with the acetic acid ester of this compound by referring to Tables V and VI.

TABLE V

[Estrogenicity of 3-desoxy-17α-hydroxy progesterone, 3-desoxy-6α-methyl-17α-hydroxy progesterone acetate and 3-Desoxy-6α-methyl-17α-hydroxy progesterone by subcutaneous administration of 1.5 mg. total dose. (Absolute weights in mg.)]

|  | Ut. Weight | Ovarian Wt. |
|---|---|---|
| Control | 4.7±0.4 | 2.5±0.39 |
| 3-Desoxy-17α-hydroxy progesterone | 5.8±0.32 | 3.2±0.26 |
| Control | 5.4±0.41 | 2.8±0.4 |
| 3-Desoxy-6α-methyl-17α-hydroxy progesterone acetate | 6.6±0.47 | 3.2±0.3 |
| Control | 4.7±0.4 | 2.5±0.39 |
| 3-Desoxy-6α-methyl-17α-hydroxy progesterone | 5.0±0.33 | 3.2±0.22 |

TABLE VI

[Androgenicity of 3-desoxy-17α-hydroxy progesterone, 3-desoxy-6α-methyl-17α-hydroxy progesterone acetate and 3-desoxy-6α-methyl-17α-hydroxy progesterone by subcutaneous administration of 1.5 mg. total dose of 3-desoxy-17α-hydroxy progesterone and 3-desoxy-6α-methyl-17α-hydroxy progesterone, 5 mg. of 3-desoxy-6α-methyl-17α-hydroxy progesterone acetate (Absolute weights in mg.)]

|  | Seminal Vesicles | Ventral Prostate |
|---|---|---|
| Control | 4.0±0.12 | 13.0±1.2 |
| 3-desoxy-17α-hydroxy progesterone | 4.4±0.14 | 16.8±0.89 |
| Control | 4.5±0.45 | 15.2±1.8 |
| 3-desoxy-6α-methyl-17α-hydroxy progesterone acetate | 4.1±0.14 | 14.6±1.0 |
| Control | 4.0±0.12 | 13.0±1.2 |
| 3-desoxy-6α-methyl-17α-hydroxy progesterone | 4.3±0.22 | 16.2±0.97 |

In the literature pertaining to inhibition of ovulation the term "ovulation inhibition" is frequently applied to a wide time-span and physiological actions that may include inhibition of follicular development through prolonged administration of inhibiting agents that generally act through inhibition of total ovarian activity, such as the natural hormones, estrogens, androgens, progestins.

The compounds of the present invention seem to effect an immediate ovulation stop, upon the short term or single administration of these esters prior to expected ovulation.

The effect described above may be confirmed as follows: Rats are first checked for the regularity of their cycles by daily vaginal examinations. For the test, rats with synchronous cycles are selected and the drug is administered at the 2 days preceding the day of expected ovulation. The drug is administered either in the diet or by stomach tubing. In the afternoon of the day when ovulation would occur the rats are autopsied and their fallopian tubes are excised and flushed out to recover ovulated ova which in untreated rats would be located at this part of the reproductive tract on their migration towards the uterus. Absence of ova is taken as indication that ovulation has been prevented. This is further checked by histological serial sections of the ovaries. If ovulation has been prevented the mature follicles will still contain ova, and no fresh corpora lutea are present.

In preliminary tests it has been investigated whether or not such treatment would merely shift ovulation time either by hastening or postponing it. Such an effect has not been demonstrated with this type of compound or schedule.

Compounds that exhibit an anti-ovulatory effect are titrated down to the minimal effective dose exerting this response. At a dosage level of 20 mg./kg. 3-desoxy-17α-hydroxy progesterone given in the diet is not capable of of stopping ovulation since 5 out of 7 rats ovulated. When given by stomach tube to 10 rats, all but one had ovulated. This result is equal to that obtained with control animals. Thus 3-desoxy-17α-hydroxy progesterone has no direct effect on the process of ovulation.

In contrast to this when 3-desoxy-6α-methyl-17α-hydroxy progesterone acetate at a dose level of only 1 mg./kg. is administered by stomach tube to 13 rats, non ovulate. When administered at the same dose level, but only once, on the day preceding proestrus, ovulation is prevented in 10 out of 12 rats. When the same amount was administered in the diet, ovulation is prevented in only 7 out of 22 rats.

It is to be understood that the invention is not to be limited to the exact details of operation or exact compounds shown and described as obvious modifications and equivalents will be apparent to one skilled in the art, and the invention is therefore to be limited only by the scope of the appended claims.

What is claimed is:
1. A compound having the structure

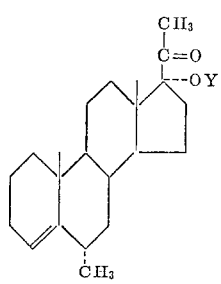

in which Y is a radical selected from the group consisting of hydrogen and alkanoyl radicals.

2. A compound having the structure

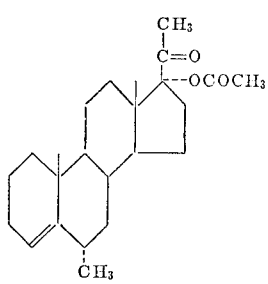

3. A compound having the structure

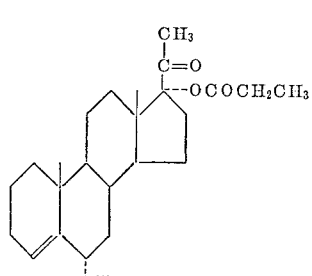

4. A compound having the structure

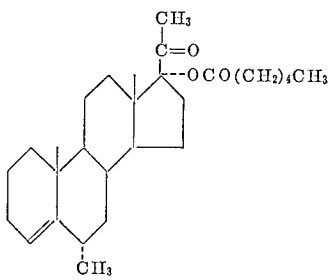

5. A compound having the structure

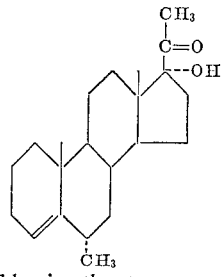

6. A compound having the structure

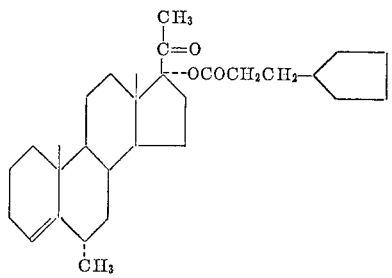

7. A compound of the formula

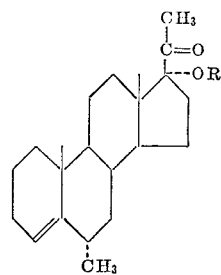

wherein R is selected from the group consisting of hydrogen and lower alkanoyl.

References Cited
UNITED STATES PATENTS

| | | | |
|---|---|---|---|
| 2,715,640 | 8/1955 | Ralls | 260—397.45 |
| 3,033,752 | 5/1962 | Clinton et al. | 167—74 |

ELBERT L. ROBERTS, *Primary Examiner.*

M. LIEBMAN, *Examiner.*

G. E. LANDE, *Assistant Examiner.*

UNITED STATES PATENT OFFICE
CERTIFICATE OF CORRECTION

Patent No. 3,390,157                      June 25, 1968

Irving Scheer

It is certified that error appears in the above identified patent and that said Letters Patent are hereby corrected as shown below:

Column 4, TABLE III, in the heading to the third column thereof, cancel "Percent"; in the heading to the fourth column thereof, "Vaginal" should read -- Percent Vaginal --. Column 5, TABLE IV, fourth column, line 3 thereof, "8.6(12.0)" should read -- 8.6(13.0) --. Column 6, line 65, cancel "of"; line 73, "non" should read -- none --.

Signed and sealed this 20th day of January 1970.

(SEAL)
Attest:

Edward M. Fletcher, Jr.                      WILLIAM E. SCHUYLER, JR.
Attesting Officer                                Commissioner of Patents